United States Patent
Ahmed et al.

(10) Patent No.: US 9,330,181 B2
(45) Date of Patent: May 3, 2016

(54) METHODS AND APPARATUSES FOR DOCUMENT PROCESSING AT DISTRIBUTED PROCESSING NODES

(71) Applicant: Yahoo! Inc., Sunnyvale, CA (US)

(72) Inventors: Fakrudeen Ali Ahmed, Bangalore (IN); Souri Nath Datta, Bangalore (IN); Vikram Verma, Bangalore (IN); Aravindan Raghuveer, Bangalore (IN); Muralidhar Hanumantachar Sortur, Bangalore (IN); Syama Prasad Suprasadachandranpillai, Bangalore (IN); Tom Praison Rajadurai A, Bangalore (IN); Sachidanand Alle, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 68 days.

(21) Appl. No.: 13/685,468

(22) Filed: Nov. 26, 2012

(65) Prior Publication Data
US 2014/0149380 A1    May 29, 2014

(51) Int. Cl.
*G06F 17/30* (2006.01)

(52) U.S. Cl.
CPC .... *G06F 17/30867* (2013.01); *G06F 17/30864* (2013.01)

(58) Field of Classification Search
CPC .............. G06F 17/30864; G06F 17/30867; G06F 17/30011; G06F 17/30699; G06F 17/30017; G06F 17/30717; G06Q 10/10; G06Q 30/02
USPC .......... 707/709, 725, 736, 737, 722, 754, 827
See application file for complete search history.

(56) References Cited

U.S. PATENT DOCUMENTS

| | | | | |
|---|---|---|---|---|
| 4,897,780 A | * | 1/1990 | Lakness | G06F 9/4881 707/999.205 |
| 6,006,218 A | * | 12/1999 | Breese | G06F 17/30864 707/999.003 |
| 6,421,675 B1 | * | 7/2002 | Ryan et al. | |
| 8,527,523 B1 | * | 9/2013 | Ravid | 707/749 |
| 2002/0078025 A1 | * | 6/2002 | Tanaka | G06F 17/30699 707/999.001 |
| 2006/0270413 A1 | * | 11/2006 | Matteo | H04M 3/5232 455/450 |
| 2007/0198495 A1 | * | 8/2007 | Buron | G06F 17/3087 707/999.003 |
| 2008/0065617 A1 | * | 3/2008 | Burke | G06F 17/30646 707/999.005 |
| 2008/0077570 A1 | * | 3/2008 | Tang et al. | 707/5 |
| 2008/0082644 A1 | * | 4/2008 | Isard | H04L 67/1097 709/223 |
| 2008/0091768 A1 | * | 4/2008 | Tanimoto | G06F 17/30094 709/202 |
| 2008/0109438 A1 | * | 5/2008 | Hengel | G06Q 30/02 707/999.007 |
| 2008/0275759 A1 | * | 11/2008 | Parkes | G06Q 30/02 705/7.34 |
| 2009/0055359 A1 | * | 2/2009 | Gross | 707/3 |
| 2009/0129405 A1 | * | 5/2009 | Lauwers | H04L 41/0896 370/468 |
| 2009/0144284 A1 | * | 6/2009 | Chatley | G06F 3/0613 707/999.202 |
| 2009/0193190 A1 | * | 7/2009 | Hsu | G06F 21/31 711/115 |
| 2010/0235392 A1 | * | 9/2010 | McCreight | G06F 17/30949 707/780 |
| 2010/0325100 A1 | * | 12/2010 | Forstall | G06F 17/30864 707/706 |
| 2011/0035449 A1 | * | 2/2011 | Amidon | G06F 17/30864 709/205 |
| 2011/0161938 A1 | * | 6/2011 | Marum | G06F 8/77 717/131 |
| 2011/0191662 A1 | * | 8/2011 | Poteet, II | G06F 17/00 715/202 |
| 2012/0229659 A1 | * | 9/2012 | Solomon | H04N 9/045 348/207.11 |
| 2013/0339321 A1 | * | 12/2013 | Doddavula | G06F 17/30584 707/693 |
| 2014/0136779 A1 | * | 5/2014 | Guha | G06F 9/5066 711/114 |

* cited by examiner

*Primary Examiner* — Phong Nguyen
(74) *Attorney, Agent, or Firm* — Berkeley Law & Technology Group, LLP

(57) ABSTRACT

Briefly, the disclosure describes embodiments of methods or apparatuses for document processing at distributed processing nodes.

20 Claims, 3 Drawing Sheets

METHODS AND APPARATUSES FOR DOCUMENT PROCESSING AT DISTRIBUTED PROCESSING NODES

BACKGROUND

1. Field

This disclosure relates to extracting knowledge from web-based documents at distributed processing nodes and preparing electronic documents from the extracted knowledge.

2. Information

For an Internet search engine, for example, to operate properly, web-based documents may generally require some level of organization and categorization prior to a search engine processing one or more search queries. This ensures that relevant content is available in a timely manner in response to a submitted search query. If such organization and cataloging of potentially millions or even billions of web-based documents were to occur only after receipt of a search query, search engine users would experience an unacceptable delay between submitting a search query and receiving results of the query. Further, such real-time searching of a huge number of web-based documents in response to individually submitted queries would represent an extraordinary burden on search engine resources.

In addition, with many thousands of new or revised web-based documents added to the Internet each day, search engine providers may be continuously cataloging contents and locations of new documents in a background process so that if a search query is received from a user, the search engine may immediately provide accurate, timely, and comprehensive results. To accommodate such a large and ever-expanding corpus of documents, standard workflow tools for analyzing and cataloging web-based documents may be employed, for example, by search engine providers. However, many cataloging and analyzing operate at an unacceptably slow pace. In one illustrative example, to analyze contents of web-based documents representing 60.0 terabytes, which may, for example, represent 60.0 million documents with each comprising an average size of 1.0 megabyte, may require a time period ranging from several hours to up to two days. Accordingly, evaluating and cataloging a constantly increasing corpus of web-based documents may consume enormous processing resources as well as requiring considerable expenditure of time.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, claimed subject matter may best be understood by reference to the following detailed description if read with the accompanying drawings in which:

Figure 1:
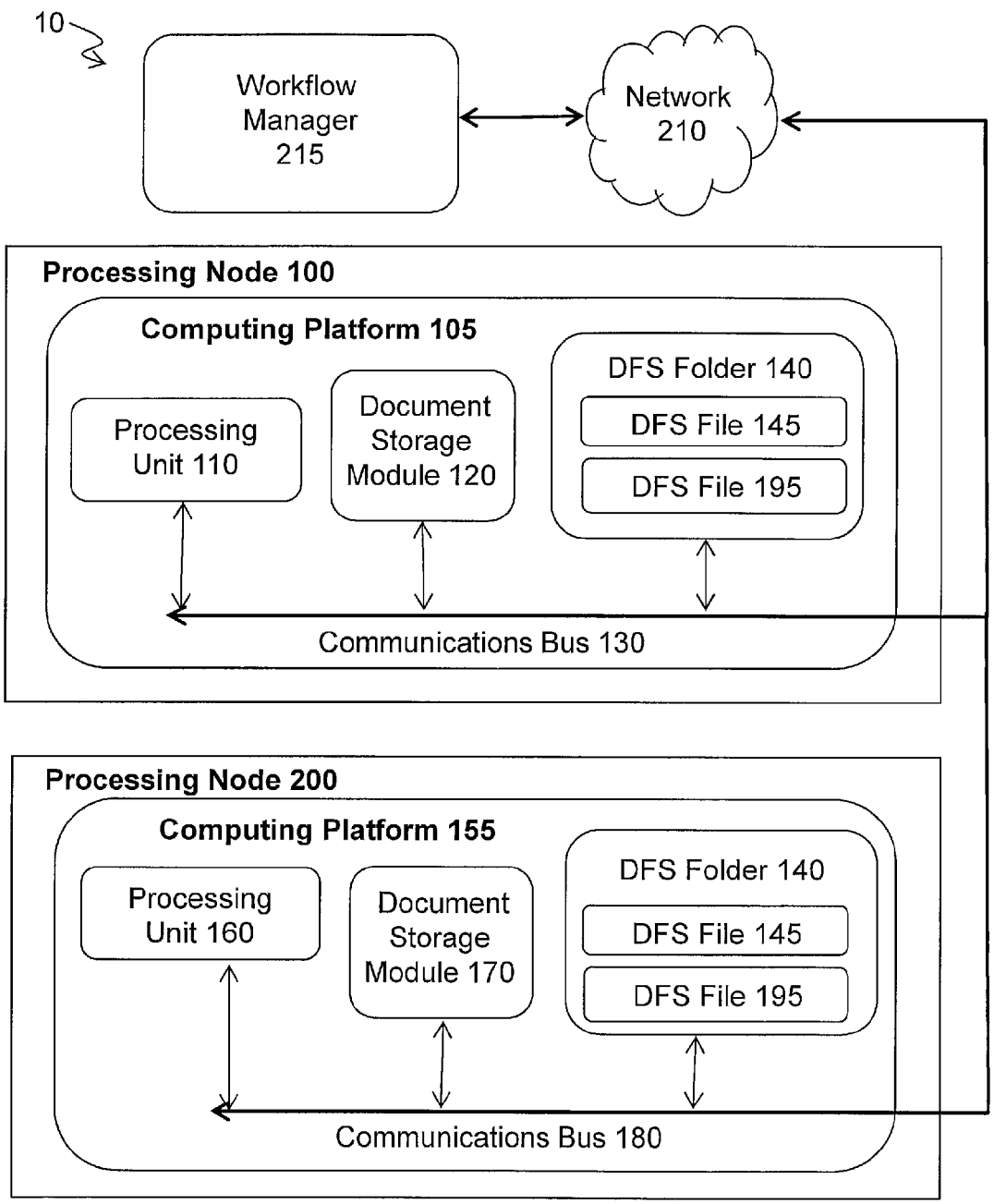
FIG. 1 is a schematic diagram of an embodiment of a system for knowledge extraction in distributed processing nodes.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

Reference throughout this specification to "one example," "one feature," "one embodiment," "an example," "a feature," or "an embodiment" means that a particular feature, structure, or characteristic described in connection with the feature, example, or embodiment is included in at least one feature, example, or embodiment of claimed subject matter. Thus, appearances of the phrase "in one example," "an example," "in one implementation," "an implementation," "an embodiment," or "in one embodiment" in various places throughout this specification are not necessarily all referring to the same feature, example, or embodiment. Furthermore, particular features, structures, or characteristics may be combined in one or more examples, features, or embodiments.

Media networks, such as the Yahoo!™ network, for example, are increasingly seeking ways to keep users within their networks. A media network may, for example, comprise an Internet website or group of websites having one or more sections appealing to different interests or aspects of a user's experience, for example. For instance, the Yahoo!™ network includes websites located within different categorized sections, such as sports, finance, current events, and games, to name just a few among possible non-limiting examples.

The more users remaining within a media network for an extended period of time, the more valuable a network may become to potential advertisers. Thus, the more money advertisers are inclined to pay to advertise to users, for example, via that media network. In an implementation, searching or use of search engines, which are often provided to a user of a client device via a server or other type of computing platform, for example, may deliver relevant documents or links, such as hyperlinks, to relevant content, which may entice users accessing documents to remain within a network for a relatively extended period of time. Links to documents, such as to websites located outside of a media network, may also be presented to users. Thus, even if users are directed to websites outside of a particular media network, users may remain loyal to the media network in the future if they believe that the media network provides links or otherwise directs them to relevant content in response to submitting a search query.

Accordingly, if a user submits a query to a search engine managed by a media network, the user may expect the search engine to return accurate search results without significant delay. If the user perceives the quality of search results to be lacking, such as including links to stale news stories, links to Internet locations where documents do not exist, and/or links to documents that appear irrelevant, the user may exit the media network and resubmit the query by way of a search engine from a different search engine provider. In some instances, this may result in a user proceeding with a decision-making activity using incomplete or perhaps less relevant search results. Similarly, if a user is seeking information from a local business directory service, such as, for example, local.yahoo.com, a user may place a premium on accurate and up-to-date local business information.

According to one or more implementations, as discussed herein, as part of a background workflow process, a computerized workflow manager may initiate a method for knowledge extraction in distributed processing nodes, wherein the nodes may comprise, for example, one or more computing platforms distributed throughout a geographic area. Computing platforms may utilize a "location aware" distributed file system such as Apache Hadoop. In an embodiment, the distributed computing mechanism operates using significantly fewer computing resources than other "distributed consensus" techniques such as Paxos-based algorithms including Chubby and Zookeeper, for example. However, implementations of claimed subject matter may represent a departure from typical distributed consensus systems by permitting computing platforms of distributed processing nodes to filter a large corpus of documents and to enter filtering results into a folder of a distributed file system.

In an example, a computing platform of a processing node executing a Hadoop-compatible file system may provide an indicator to a Hadoop application that informs the application of the processing node, for example, or the network switch behind which the processing node is located. In this manner, computing platforms may notify a Hadoop application of the processing nodes performing filtering operations. A workflow manager utilizing a location-aware distributed file system may allocate electronic documents to processing nodes based, at least in part, on geographic locations of the documents relative to locations of processing nodes. Thus, a computing platform may access documents stored in an electronic form without requiring documents to be transported over an excessively long distance through an intervening communications infrastructure, such as the Internet, a corporate network, or other portion of a real-time computing network.

In certain implementations, a workflow manager may execute machine-readable instructions to generate one or more output signals to direct processing nodes to determine a number of documents that meet filtering criteria. Computing platforms of processing nodes may access files of a folder of a distributed file system to compare a total number of filtering results with a requested threshold number of documents from a workflow manager. The method may also include a workflow manager receiving one or more electronic signals from at least some of the processing nodes if a total number of documents meeting the filtering criteria reaches or exceeds a requested threshold value. In one possible example, a workflow manager may request an initial estimate that 200 documents drawn from a larger corpus of, for example, several billion documents or more meet filtering criteria pertaining to particular sporting events. A workflow manager may direct processing nodes to filter documents allocated to the processing nodes against filtering criteria such as, for example, documents that include the words "soccer," "2012 Olympics," and "July." In other examples, a workflow manager may direct processing nodes to filter documents according to document attributes such as presence and/or frequency of keywords, names, document authors, phrases, concepts, geographical areas, current events, historical events, organizations, and numerous other criteria.

A workflow manager may create an electronic document comprising information states extracted from filtered documents according to any electronic document model. Possible examples of information states extracted from filtered documents may include information states pertaining to stores or retail outlets selling certain brands of products in particular areas. Another example may pertain to filtering recipes for cooking certain dishes or recipes that include certain ingredients. Other examples may include universal resource locators (URLs) of homepages for points of interest, such as schools, parks, recreational facilities, and restaurants, and claimed subject matter is not limited in this regard.

In particular implementations, a workflow manager may create a folder of a distributed file system accessible to a plurality of computing platforms performing document filtering and/or other types of processing. In implementations, a distributed file system may be implemented in a client/server architecture in which clients are capable of accessing and processing information states stored on a server as if the information states were stored locally. A distributed file system may utilize a namespace wherein an administrator may create a unified namespace that does not depend on a physical file location. Accordingly, folders within a distributed file system may be moved from one server to another without disrupting client activities. Files within folders of the distributed file system can be replicated in a manner in which small changes to files may be replicated without requiring replication of entire file. It should be noted however that a distributed file system may comprise any type of logical container for electronic records other than "folders" per se, and claimed subject matter is not limited in this respect. For example, in particular implementations a container may comprise a single file with portions of the single file being allocated for use by different processes. In other implementations, a property of a container, such as a folder or a file, may be an ability to assign a unique storage location of the container for writing by at least a first process and for reading by at least a second process.

As documents allocated to processing nodes are filtered against filtering criteria, computing platforms that comprise processing nodes may generate a "hit count" representing a number of documents meeting filtering criteria. A hit count may be stored in a particular file of a distributed file system. After a period of time has elapsed, for example, or based on other events, processing nodes of a distributed consensus system may access a distributed file system folder of a computing platform to determine a number of documents meeting filtering criteria identified and/or catalogued by the one or more processing nodes. A workflow manager may receive a total number of documents identified by processing nodes meeting filtering criteria. Computing platforms of processing nodes may access files of a distributed file system from one or more processing nodes to determine results processing metadata, such as, for example, a most current count of documents successfully retrieved against filtering criteria. In implementations, processing nodes may terminate filtering if a total number of documents meeting filtering criteria reaches or exceeds a threshold number of documents expected to meet the filtering criteria.

In implementations, a workflow manager may perform a knowledge extraction algorithm and enter named entities, relationships, concepts, instances, taxonomic relations, and other extracted knowledge-related entities into an electronic document. In response to receiving a search query from a user after filtering and knowledge extraction have been performed, a search engine may assemble information states representing knowledge from one or more electronic documents for use by the user. In implementations, electronic documents may correspond to structured electronic documents comprising an Extensible Markup Language (XML), JavaScript Object Notation (JSON), just to name a few examples, or may be encoded by way of any other structured model. However, it should be noted that processing other than filtering may occur prior to or during knowledge extraction, and claimed subject matter is not limited in this regard.

FIG. 1 is a schematic diagram of an embodiment of a system 10 for knowledge extraction in distributed processing nodes. In FIG. 1, computing platform 105 comprises a processing unit 110, document storage module 120, and distributed file system (DFS) folder 140, for example. DFS folder 140 represents system folder that logically exists, for example, within computing platform 105 and computing platform 155. Within DFS folder 140 is DFS file 145, which may represent one or more electronic records for storing information states that may be accessible to one or more processing units of computing platform 105, such as processing unit 110, by way of communications bus 130, for example. DFS folder 140 may represent any file that can be accessed from more than one computing platform, such as workflow manager 215, computing platform 105, and/or computing platform 155.

In an implementation, processing units 110 may perform processing, such as filtering, of documents accessible to document storage module 120 and store filtering results in DFS file 145. Likewise, processing unit 160 may perform processing, such as filtering, of documents accessible to document storage module 170 and store filtering results in DFS file 195. In an implementation, since DFS files 145 and 195 are common to or logically exist, for example, within DFS folder 140, results of filtering operation are accessible to the distributed processing nodes of FIG. 1. Accordingly, filtering processes may access DFS file 145 and DES file 195, to determine a total number of documents meeting filtering criteria. Workflow manager 215 may generate one or more structured electronic documents comprising filtering results of documents meeting filtering criteria. Although the architecture of computing platform 105 has been simplified, implementations may comprise additional processing units, communications buses, local and system folders, and so forth, and claimed subject matter is not limited to any particular architecture.

Communications bus 130 may communicate among processor 110, document storage 120, and DFS folder 140. Communications bus 180 may communicate among processor 160, document storage 170, and DFS folder 140. Computing platforms 105 and 155 may communicate among each other and with workflow manager 215 along with other processing entities such as file servers, routers, network switches, workstations, and so forth, by way of network 210, and claimed subject matter is intended to embrace a wide variety of processing and/or computing entities located throughout the World Wide Web, for example.

Computing platform 105 may represent, for example, one or more computing devices within processing node 100. Computing platform 105 may be located in, for example, a different geographical location than computing platform 155 of processing node 200. Accordingly, processing node 100 may comprise perhaps dozens of computing and/or processing resources organized as individual processing entities or organized into processing clusters or processing groups. Thus, although processing nodes 100 and 200 are shown as comprising a single computing platform, such as computing platform 105 in processing node 100, in other implementations, for example, processing nodes may comprise perhaps dozens of computing platforms performing any number of computing tasks, and claimed subject matter is not limited to particular organized structures of computing platforms within processing nodes.

Likewise, computing platform 155 may represent one or more computing devices and/or processing resource or may represent one or more clusters of individual processing entities organized into processing nodes, for example. Further, although implementations may describe processing nodes comprising computing platforms 105 and 155 as being located at different geographical locations, it should be noted that computing platform 105 of processing node 100 may be located proximate with computing platform 155 of processing node 200, and claimed subject matter is not limited in this respect. Further, although network 210 is shown as providing a communications path between workflow manager 215 and computing platforms 105 and 155, in many implementations, network 210 (and, for example, network 420 of FIG. 3) may represent any abstraction for a perhaps complex infrastructure that may be used to deliver computing and storage capacity, broad network access, and resource pooling to a large number of users by way of, for example, physical devices that comprise the Internet.

In implementations, such as that of FIG. 1, processing unit 110 of computing platform 105 may execute machine-readable instructions that filter electronically-stored documents allocated to processing node 100. Documents accessible to storage module 120 may number into the hundreds of thousands, millions, or perhaps even billions. In certain implementations, document storage module 120 may represent one or more electronic storage facilities, some or all of which may be co-located with computing platform 105, or may be, for example, located remotely from computing platform 105 and coupled to processing unit 110 by way of communications bus 130. Accordingly, implementations of computing platform 105 may include those in which document storage module 120 forms an integral part of computing platform 105. In other implementations, electronic storage facilities represented by document storage module 120 may be located remotely from computing platform 105, and claimed subject matter is not limited in this respect.

As part of the background workflow process, workflow manager 215 may instruct processing nodes that comprise computing platforms to filter documents, such as documents stored within or accessible to document storage module 120 of computing platform 105 and documents stored within or accessible to document storage module 170 of computing platform 155. A computing platform may apply filtering processes to determine a number of documents meeting specified filtering criteria. They workflow manager may generate an electronic document by accessing one or more files of a distributed file system of a distributed file system folder common to processing nodes of a distributed computing system, for example.

In implementations, workflow manager 215 may generate one or more structured electronic documents comprising information states extracted from filtering results. Information states may be encoded in an electronic document using a machine-readable format, such as Extensible Markup Language (XML), which may embody a set of rules for encoding documents in machine-readable form. In particular implementations, information states may be encoded in an information-interchange format such as JavaScript Object Notation (JSON) that encodes data in a collection of name/value pairs, for example, or may be encoded by way of any other structured model.

Although FIG. 1 shows only two processing nodes (100, 200) and two computing platforms (105, 155), implementations may include dozens, or even hundreds of processing nodes, wherein processing nodes may include numerous computing platforms. For example, a workflow manager, such as workflow manager 215, may direct hundreds or perhaps thousands of computing platforms, for example, which may be located at hundreds of processing nodes throughout a widely dispersed geographic area, so that documents accessible to or stored within computing platforms may be filtered according to filtering criteria. Accordingly, claimed subject matter is not limited to a particular number of computing platforms located at any number of processing nodes. Regardless of the number of nodes involved, processing nodes 100, 200, and perhaps others, operate as a distributed consensus system to determine the total number of documents from various processing nodes that meet filtering criteria. If a total number of documents reaches or exceeds a predetermined threshold, a processing node may notify workflow manager 215.

Figure 2:
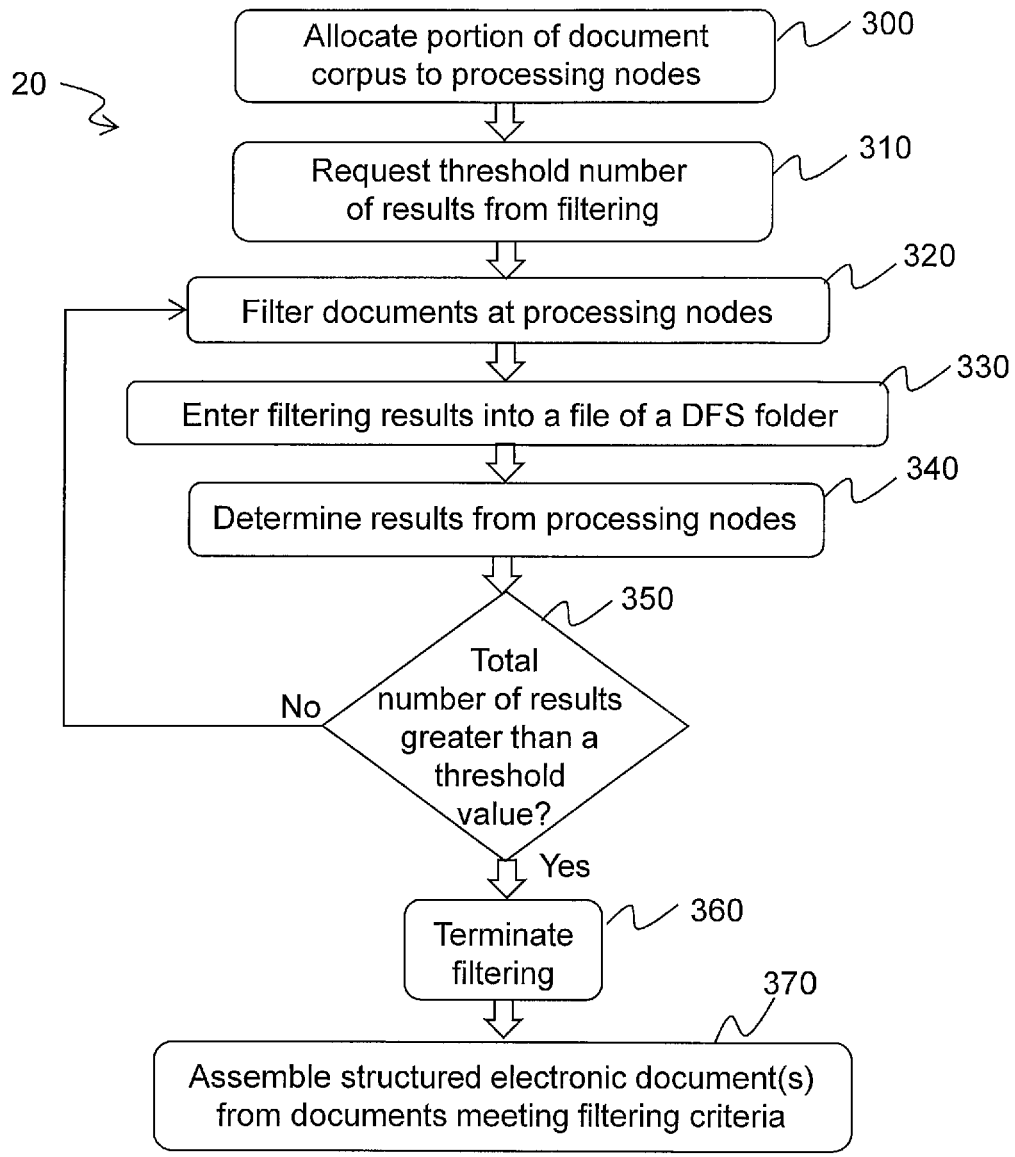
FIG. 2 is a flow diagram of a process according to an embodiment of a method for knowledge extraction in distributed processing nodes.

FIG. 2 is a flow diagram of a process 20 according to an embodiment of a method for knowledge extraction in distributed processing nodes. In some implementations, the system of FIG. 1 may be suitable for performing the method of FIG. 2, although alternate arrangements of components may be used in other implementations without deviating from claimed subject matter. Embodiments may include blocks additional to those shown and described, fewer blocks, blocks occurring in an order different from FIG. 2, or any combination thereof.

At block 300, a corpus of documents may be allocated to processing nodes for filtering by one or more computing platforms against filtering criteria. A corpus of documents allocated at block 300 may comprise a significant portion, or perhaps substantially all documents available on network 210 of FIG. 1. As mentioned previously, a corpus of documents may include for example, hundreds of thousands, millions, or perhaps billions of documents allocated among hundreds of processing nodes, for example, dispersed throughout a wide geographic area.

Processing nodes may execute a location-aware distributed file system such as Apache™ Hadoop™ in which electronic documents may be allocated based on geographic locations of storage facilities, which may store at least portions of electronic documents. Using a location-aware distributed file system as previously described herein, computing platforms located at geographically-dispersed processing nodes may access and filter electronic documents without a need to transport electronic documents over large distances by way of an intervening communications infrastructure, such as network 210 of FIG. 1. It should be noted, however, that any number of other types of file systems may be employed, and claimed subject matter is not limited in this regard.

At block 310, a workflow manager may request an approximate expected number of results from filtering, which may include a threshold number. In implementations, a workflow manager may request an integer number of documents, such as 100, 200, 500, and so forth that meet filtering criteria; however, in other implementations, a workflow manager may request a smaller number of documents, such as 25, or 50, for example, or a greater number of documents or may request a large number of documents, such as 750, 1000, or more. In implementations, filtering criteria may be directed toward certain knowledge disciplines, such as sports, finance, real estate, and so forth. It should be noted, however, that documents may be filtered against a variety of criteria, and claimed subject matter is not limited in this respect.

At block 320, processing nodes may filter documents according to filtering criteria. Filtering may occur, for example, using one or more of computing platforms 105 and 155 of FIG. 1 located at processing nodes dispersed throughout a wide geographical area. At block 330, as computing platforms detect documents that meet particular search criteria, computing platforms may record a number of documents meeting specified filtering criteria in a DFS file. In other implementations, catalog identifiers and/or additional metadata associated with detected documents may be stored in a DFS file, and claimed subject matter is not limited in this respect.

At block 340, computing platforms within processing nodes, for example, may access DFS files from various processing nodes to determine a number of electronic documents that meet filtering criteria. In certain implementations, computing platforms may access DFS files within a distributed file system folder, such as distributed file system folder 140 of FIG. 1. Block 340 includes totaling or counting contributions from distributed file system folder to determine a total number of electronic documents that meet filtering criteria. It should be noted, however, that a total number of electronic documents that meet filtering criteria may be determined using procedures other than totaling contents of distributed file system folders, and claimed subject matter is intended to embrace these procedures as well.

At block 350, one or more computing platforms may compare a number of results counted at block 340 with a threshold number of documents, such as, for example, 100, 200, or other number. In an implementation, a number of documents meeting filtering criteria totaled at block 350 may deviate from an expected number by 5.0%, 10.0%, or other tolerance value. Thus, in one possible example, processing nodes may identify an expected number of documents meeting filtering criteria approximately equal to 200 or more documents with a tolerance of 5.0%. Accordingly, if processing nodes determine that a higher threshold of filtered documents has been found (i.e., 210 documents) the computing platform, for example, may terminate filtering operations, such as at block 360. Block 320 includes continuing to filter documents at various processing nodes if a number of documents totaling a lower threshold have not been found.

In an implementation, a workflow manager may prune filtering results to achieve a requested number of results. In the above example, for instance, if a workflow manager requests 200 documents and processing nodes determine that 210 documents meet specified filtering criteria, the workflow manager may reduce the number of results from 210 documents to 200 documents. However, at least in some implementations, filtering results need not be pruned, and claimed subject matter is not limited in this respect.

If a decision at block 350 indicates that a computing platform of a processing node has detected a threshold number of documents meeting filtering criteria, filtering may be terminated at block 360. The method of FIG. 2 may conclude at block 370, in which, for example, a workflow manager may generate one or more structured electronic documents comprising information states extracted from documents filtered against filtering criteria at processing nodes.

Figure 3:
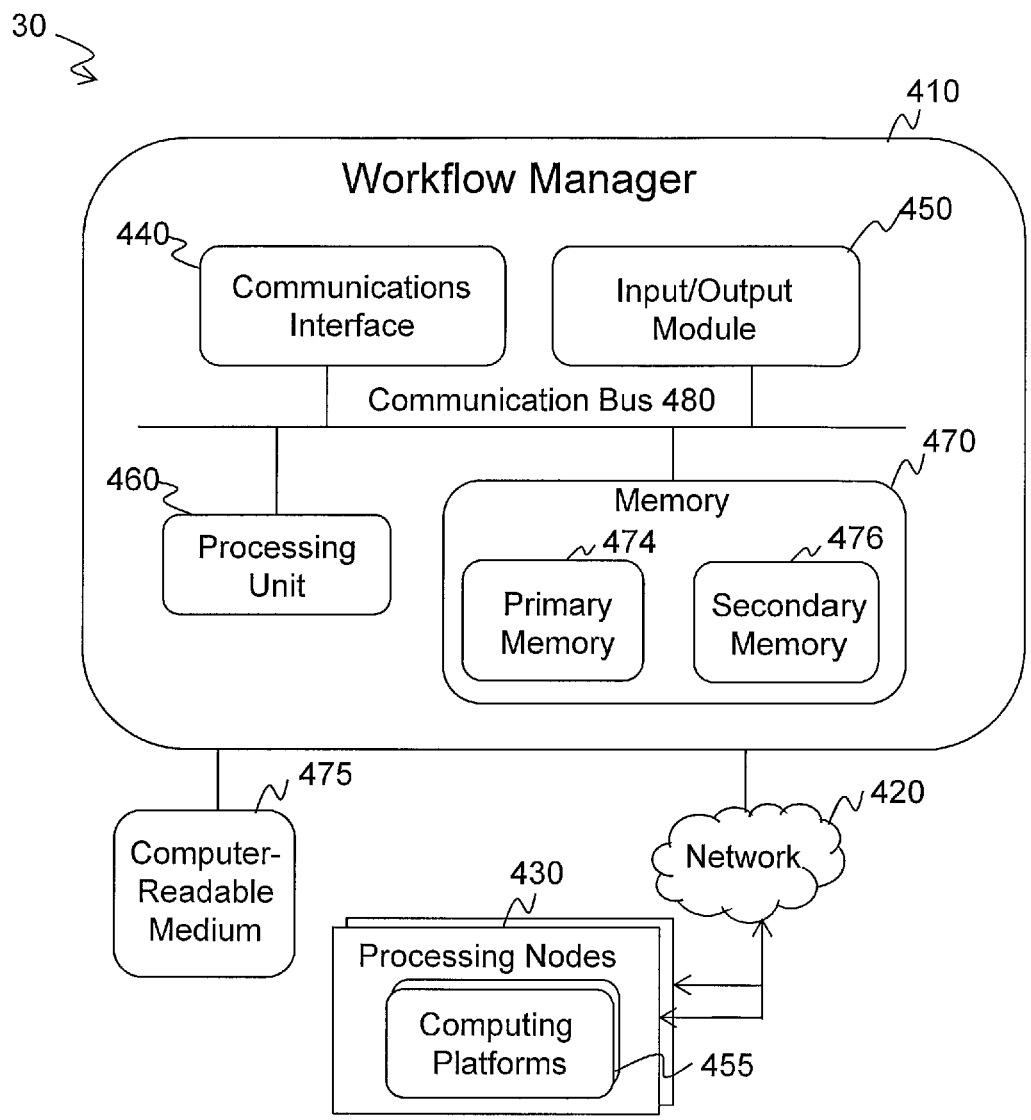
FIG. 3 is a schematic diagram of a system including a workflow manager that may be employed for knowledge extraction in distributed processing nodes according to an embodiment.

FIG. 3 is a schematic diagram of a system 30 including a workflow manager that may be employed for knowledge extraction in distributed processing nodes according to an embodiment. In FIG. 3, workflow manager 410 may communicate with network 420 to direct processing nodes 430 to filter electronic documents accessible to computing platforms 455 according to filtering criteria. Communications interface 440, input/output module 450, one or more processing units, such as processing unit 460, and memory 470, which may comprise primary memory 474 and secondary memory 476, may communicate among one another by way of communication bus 480, for example. Although the workflow manager of FIG. 3 shows the above-identified elements, claimed subject matter is not limited to a workflow manager comprising only these elements as other implementations may include alternative arrangements that may include additional components, fewer components, or components that function differently while achieving similar results.

In an example implementation, a user may instruct workflow manager 410 to schedule background operations in which one or more of computing platforms 455 may be requested to filter through at least part of a corpus of documents allocated to one or more of processing nodes 430. If computing platform 455 detects one or more documents meeting filtering criteria, platform 455 may generate electrical signals representing information states that identify a detected document and generate a signal representing a hit count. Electrical signals representing a hit count may be stored as information states in a non-transitory storage medium, such as a distributed file system folder. In implementations, a hit count may represent a number of documents meeting filtering criteria. If a threshold number of documents has been reached, as determined by one or more of computing platforms 455 filtering operations may be terminated and results transmitted to a workflow manager. Computing platforms 455 may transmit information states representing extracted knowledge from a number of documents meeting filtering criteria to workflow manager 410. A variety of approaches are possible and claimed subject matter is intended to cover such approaches.

Memory 470 may be representative of any storage mechanism. Memory 470 may include, for example, primary memory 474 and secondary memory 476, although nothing prevents a use of additional memory circuits, mechanisms, or combinations thereof. Memory 470 may comprise, for example, random access memory, read only memory, or one or more data storage devices or systems, such as, for example, a disk drive, an optical disc drive, a tape drive, a solid-state memory drive, to name just a few examples. Memory 470 may be utilized to store one or more structured electronic documents, which may include results of document filtering performed by one or more of computing platforms 455. Memory 470 may also comprise a memory controller for accessing computer readable-medium 475 that may carry and/or make accessible content, code, and/or instructions, for example, executable by processing unit 460 or some other controller or processor capable of executing instructions, for example. Although computer readable-media 475 is shown in FIG. 3 as detached from workflow manager 410, computer-readable media may be included within the enclosure of workflow manager 410, and claimed subject matter is not limited in this respect.

Network 420 may comprise one or more communication links, processes, and/or resources to support exchanging communication signals among users, such as one or more computing platforms 455 associated with processing nodes 430, and workflow manager 410. By way of example but not limitation, network 420 may include wireless and/or wired communication links, telephone or telecommunications systems, Wi-Fi networks, Wi-MAX networks, the Internet, the web, a local area network (LAN), a wide area network (WAN), or any combination thereof.

A computer-readable (storage) medium, such as computer-readable medium 475 of FIG. 3, typically may comprise non-transitory and/or comprise a non-transitory device. In this context, a non-transitory storage medium may include a device that is tangible, meaning that the device has a concrete physical form, although the device may change its physical state. Thus, for example, non-transitory refers to a device remaining tangible despite a change in state.

A computer-readable (storage) medium may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where "disks" usually reproduce data magnetically, while "discs" reproduce data optically with lasers. Combinations of the above should also be included within the scope of computer-readable media.

The term "computing platform" as used herein refers to a system and/or a device that includes a capability to process and/or store data in the form of signals and/or states. Workflow manager 410 as depicted in FIG. 3 and computing platforms 105 and 155 of FIG. 1 may comprise one or more processing units 460 and 110, respectively, to perform data processing in accordance with the techniques provided herein. Processing unit 110 and 460 may, for example, be implemented in hardware or a combination of hardware and software (other than software per se). Processing unit(s) 460 and 110 may be representative of one or more circuits configured or adapted to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof. Workflow manager 410 as depicted in FIG. 3 and computing platforms 105 and 155 of FIG. 1 are merely example computing platforms, and the scope of claimed subject matter is not limited to these particular examples.

For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by one or more processing unit located at a computing platform. The terms, "and", "or", and "and/or" as used herein may include a variety of meanings that also are expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, and/or characteristic in the singular and/or may be used to describe a plurality or some other combination of features, structures and/or characteristics. However, it should be noted that this is merely an illustrative example and claimed subject matter is not limited to this example.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states stored within a memory of a specific apparatus or special purpose computing device or processing unit. In the context of this particular specification, the term "specific apparatus" or the like includes a general-purpose computing device, such as general-purpose computer, once it is programmed to perform particular functions pursuant to instructions from program software. Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "determining", "establishing", "obtaining", "identifying", "selecting", and/or the like may refer to actions and/or processes of a specific apparatus, such as a special purpose computer and/or a similar special purpose computing device. In the context of this specification, therefore, a special purpose computer and/or a similar special purpose computing device is capable of manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, the term "specific apparatus" may include a general-purpose computing device, such as a general-purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method comprising:
   executing instructions by one or more processors to bring about:
   allocating at least some documents, of a plurality, to be filtered substantially in accordance with a location-aware process, the location-aware process being based, at least in part, on geographic locations of the at least some documents, of the plurality, to be filtered relative to locations of processing nodes;
   selecting documents of the plurality and an allowed tolerance to meet a filtering criteria; and
   providing an indication if a total of documents that meet the filtering criteria reaches a threshold within the allowed tolerance.

2. The method of claim 1, further comprising:
   executing instructions by the one or more processors to bring about:
   generating at least one electronic document comprising content extracted from at least some of the total documents that meet the filtering criteria.

3. The method of claim 1, wherein the one or more processors comprises a plurality of processors located at a plurality of processing nodes to implement a distributed file system.

4. The method of claim 1, wherein the one or more processors comprise a plurality of processors located at a plurality of processing nodes to implement a distributed consensus system.

5. The method of claim 4, wherein a first processing node of the plurality of processing nodes adds results local to the first processing node with results local to a second processing node of the plurality of processing nodes.

6. An apparatus, comprising:
   one or more processors to:
   allocate at least some documents, of a plurality, to be filtered substantially in accordance with a location-aware process, the location-aware process to be based, at least in part, on geographic locations of the at least some documents of the plurality to be filtered relative to locations of processing nodes;
   request at least one threshold, and an allowed tolerance from the at least one threshold, that is to be used to determine if processes to occur at a plurality of nodes are to be terminated; and
   provide a total of results from at least one of the plurality of nodes if the at least one threshold, within the allowed tolerance, were to be reached.

7. The apparatus of claim 6 wherein at least one of the plurality of nodes to assemble results from a first node of the plurality of nodes and results from a second node of the plurality of nodes to determine the total of the results.

8. The apparatus of claim 7, wherein the first node of the plurality of nodes and the second node of the plurality of nodes to comprise a distributed file system.

9. The apparatus of claim 6, wherein the one or more processors are further to generate at least one electronic document.

10. The apparatus of claim 9, wherein the one or more processors are further to generate the at least one electronic document from a folder to be shared among the plurality of nodes.

11. The apparatus of claim 10, wherein the at least one electronic document comprises: named entities, relationships, concepts, instances, taxonomic relations, or any combination thereof.

12. The apparatus of claim 6, wherein the one or more processors to allocate a first plurality of documents to be filtered at a first node of the plurality of nodes and to allocate a second plurality of documents to be filtered at a second node of the plurality of nodes substantially in accordance with the location-aware process.

13. The apparatus of claim 6, wherein the plurality of nodes to execute a distributed consensus system and further to resume if the at least one threshold has not been approached.

14. An article comprising:
a non-transitory storage medium comprising instructions executable by a special purpose computing apparatus to:
allocate at least some documents, of a plurality, to be filtered substantially in accordance with a location-aware process, the location-aware process to be based, at least in part, on geographic locations of the at least some documents, of the plurality, to be filtered relative to locations of processing nodes;
request at least one threshold, and an allowed tolerance from the at least one threshold, that is to be used to determine if processes to occur at a plurality of nodes are to be terminated; and
provide a total of results from at least one of the plurality of nodes if the at least one threshold, within the allowed tolerance, were to be reached.

15. The article of claim 14, wherein the non-transitory storage medium additionally comprises instructions executable by the special purpose computing apparatus to:
assemble results from a first node of the plurality of nodes and results from a second node of the plurality of nodes to determine the total of the results.

16. The article of claim 14, wherein the non-transitory storage medium additionally comprises instructions executable by the special purpose computing apparatus to:
generate at least one electronic document.

17. The article of claim 16, wherein the non-transitory storage medium additionally comprises instructions executable by the special purpose computing apparatus to:
generate the at least one electronic document from a folder to be shared among the plurality of nodes.

18. The article of claim 17, wherein the at least one electronic document comprises named entities, relationships, concepts, instances, taxonomic relations, or any combination thereof.

19. The article of claim 14, wherein the non-transitory storage medium additionally comprises instructions executable by the special purpose computing apparatus to:
allocate a first plurality of documents to be filtered at a first node of the plurality of nodes and to allocate a second plurality of documents to be filtered at a second node of the plurality of nodes substantially in accordance with the location-aware process.

20. The article of claim 14, wherein the non-transitory storage medium additionally comprises instructions executable by the special purpose computing apparatus to:
execute a distributed consensus system and further to resume if the at least one threshold has not been approached.

* * * * *